C. D. & M. C. MEIGS.
Improvement in Sod-Carriers.
No. 130,231.  Patented Aug. 6, 1872.
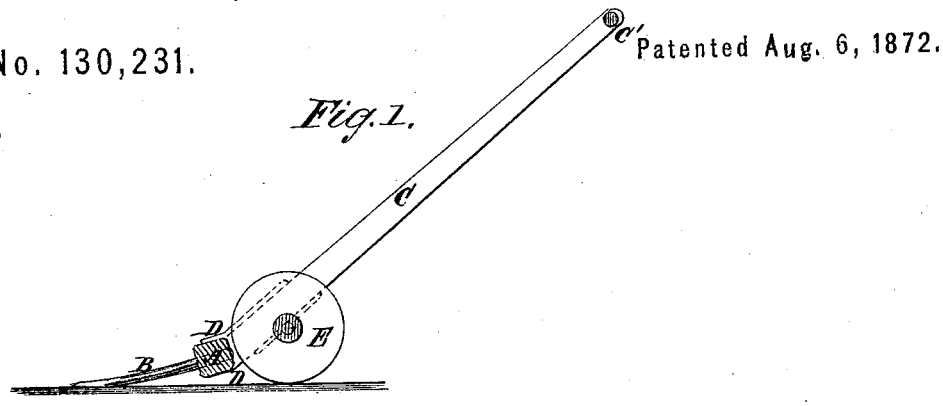
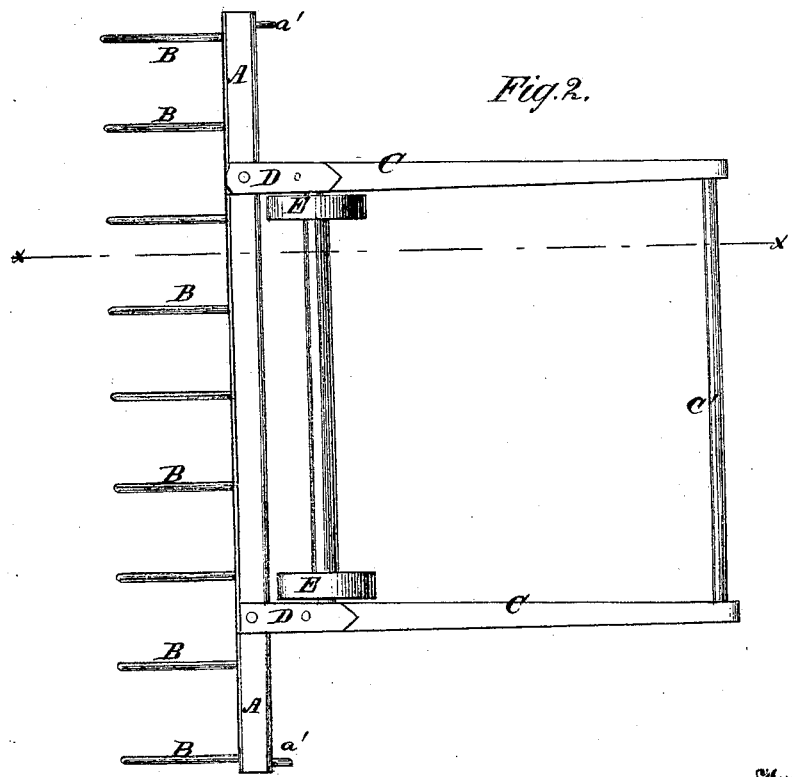
Witnesses:
John Becker
Geo. W. Mabee
Inventor:
C. D. Meigs
M. C. Meigs
Per Munn & Co
Attorneys.

UNITED STATES PATENT OFFICE.

CHARLES D. MEIGS AND MONTGOMERY C. MEIGS, OF ROMNEY, INDIANA.

IMPROVEMENT IN SOD-CARRIERS.

Specification forming part of Letters Patent No. 130,231, dated August 6, 1872.

Specification describing a new and useful Improvement in Sod-Carrier, invented by CHARLES D. MEIGS and MONTGOMERY C. MEIGS, of Romney, in the county of Tippecanoe and State of Indiana.

Figure 1 is a detail cross-section of our improved sod-carrier taken through the line $x\,x$, Fig. 2. Fig. 2 is a top view of the same.

Similar letters of reference indicate corresponding parts.

Our invention has for its object to furnish an improved sod-carrier, designed especially for use in carrying off the stiff prairie sod turned over by the plow in opening ditches, grading roads, &c., and which shall be simple in construction, convenient in use, and effective in operation, enabling more work to be done in less time and with less labor for man and team than when the ordinary means are employed; and it consists in the construction and combination of the various parts of the sod-carrier, as hereinafter more fully described.

A represents a strong bar or beam, which may be six feet, more or less, in length, as may be desired. To the bar A, at suitable distances apart, are attached forwardly-projecting teeth B, which may project ten inches, more or less, and which should curve slightly upward. To the rear side of the bar A are attached handles or levers C, which should incline somewhat upward, and the outer or upper ends of which are connected by a round or bar, $c'$, which serves as a handle in operating the carrier. The connection between the handles C and bar A should be strengthened by metallic straps or plates D. To the handles or levers C, near their lower ends, are pivoted small wheels E, eight inches, more or less, in diameter. The wheels E may revolve upon short axles connected with said handles C, or upon a long axle, as may be desired; but in either case they should revolve independent of each other for convenience in turning.

The carrier is designed to be drawn by a chain, the ends of which are attached to the bar A near its ends, as indicated by the staples $a'$, and provided with a ring at its center for the attachment of the draft.

In using the machine, the teeth B are thrust beneath the sod to be carried, which sod is raised from the ground by bearing down upon the levers or handles C, the wheels E serving as fulcrums. The sod is then drawn upon the wheel E to the desired place, where it is allowed to slip from the teeth B.

Having thus described our invention, we claim as new and desire to secure by Letters Patent—

As an article of manufacture, a sod-carrier composed of frame C C', journaled in low wheels E E, and provided with the toothed carrier A B extending out on each side thereof, as described.

CHARLES D. MEIGS.
MONTGOMERY C. MEIGS.

Witnesses:
JOHN LEVERING,
CHARLES D. MEIGS, Jr.